(12) United States Patent
Fong et al.

(10) Patent No.: US 8,711,500 B1
(45) Date of Patent: Apr. 29, 2014

(54) DISK DRIVE TO ENABLE DEFECT MARGINING

(75) Inventors: Theen-Leong Fong, Puchong (MY); William Chong, Shah Alam (MY); Hasni Zaidy Abdul Hamid, Kuala Lumpur (MY); Muhammad Nur Syukri Bin Ahmad Shukor, Karak (MY); Syaiful Hazli Hamdan, Subang Jaya (MY); Petrus Hu, Petaling Jaya (MY); Philip Bernard Saram, Kuala Lumpur (MY)

(73) Assignee: Western Digital Technologies, Inc., Irvine, CA (US)

( * ) Notice: Subject to any disclaimer, the term of this patent is extended or adjusted under 35 U.S.C. 154(b) by 297 days.

(21) Appl. No.: 13/168,551

(22) Filed: Jun. 24, 2011

(51) Int. Cl.
*G11B 27/36* (2006.01)

(52) U.S. Cl.
USPC .............................................. 360/31; 360/53

(58) Field of Classification Search
None
See application file for complete search history.

(56) References Cited

U.S. PATENT DOCUMENTS

| | | | |
|---|---|---|---|
| 5,917,724 A | | 6/1999 | Brousseau et al. |
| 6,034,831 A | * | 3/2000 | Dobbek et al. .................. 360/53 |
| 6,078,452 A | * | 6/2000 | Kittilson et al. ................ 360/51 |
| 6,151,180 A | * | 11/2000 | Bang ................................ 360/53 |
| 6,204,660 B1 | | 3/2001 | Lee |
| 6,223,303 B1 | * | 4/2001 | Billings et al. ............... 714/6.13 |
| 6,408,406 B1 | | 6/2002 | Parris |
| 6,563,776 B1 | * | 5/2003 | Oi et al. ..................... 369/53.15 |
| 6,717,758 B2 | | 4/2004 | Adams et al. |
| 6,850,379 B2 | * | 2/2005 | Andoh et al. ................... 360/53 |
| 6,985,319 B2 | * | 1/2006 | Yip et al. ........................ 360/48 |
| 7,072,129 B1 | * | 7/2006 | Cullen et al. ................... 360/31 |
| 7,139,145 B1 | | 11/2006 | Archibald et al. |
| 7,245,445 B2 | | 7/2007 | Lee |
| 7,583,461 B2 | * | 9/2009 | Kudoh et al. ................... 360/53 |
| 7,839,588 B1 | * | 11/2010 | Dang et al. ..................... 360/31 |
| 8,054,717 B1 | * | 11/2011 | Yang et al. ................. 369/47.14 |
| 8,169,725 B2 | * | 5/2012 | Jun ................................. 360/31 |
| 2002/0191319 A1 | | 12/2002 | Liew et al. |
| 2004/0153845 A1 | * | 8/2004 | Nam ........................... 714/42 |
| 2004/0158769 A1 | * | 8/2004 | Park ................................. 714/7 |
| 2006/0056088 A1 | * | 3/2006 | Kudoh et al. ................... 360/31 |
| 2006/0171057 A1 | * | 8/2006 | Lee ................................. 360/69 |
| 2007/0146921 A1 | * | 6/2007 | Jun ................................. 360/53 |
| 2008/0270675 A1 | | 10/2008 | Nagaraj et al. |
| 2010/0315916 A1 | | 12/2010 | Takahashi et al. |

* cited by examiner

Primary Examiner — Dismery Mercedes

(57) ABSTRACT

A disk drive is disclosed that enables defect margining during disk drive burn-in testing. The disk drive comprises: a disk comprising a plurality of tracks; a head actuated over the disk; and a processor. The processor is configured to: perform disk drive burn-in testing to detect media defects; generate an initial defect list based upon detected media defects for sectors; generate an extended defect list that includes detected media defects and extended defect margins from the detected media defects; and utilize the extended defect list for burn-in, wherein a spare area of the disk allows for the detected media defects and the extended defect margins.

26 Claims, 10 Drawing Sheets

DISK DRIVE TO ENABLE DEFECT MARGINING

BACKGROUND

Today, computing devices such as personal computers, laptop computers, personal digital assistants, cell-phones, etc., are routinely used at work, home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers, laptop computers, as well as small form factor (SFF) disk drives for use in mobile computing devices (e.g., personal digital assistants (PDAs), cell-phones, digital cameras, etc.). To be competitive, a disk drive should be relatively inexpensive and provide substantial capacity, rapid access to data, and reliable performance.

Disk drives typically comprise a disk and a head connected to a distal end of an actuator arm which is rotated by a pivot by a voice coil motor (VCM) to position the head radially over the disk. The disk typically comprises a plurality of radially spaced, concentric tracks for recording user data sectors and servo sectors. The servo sectors typically comprise head positioning information (e.g., a track address) which is read by the head and processed by a servo control system to control the velocity of the actuator arm as it seeks from track to track.

Data is typically written to the disk by modulating a write current in an inductive coil to record magnetic transitions onto the disk surface. During readback, the magnetic transitions are sensed by a read element (e.g., a magnetoresistive element) and the resulting read signal demodulated by a suitable read channel.

To be competitive in the hard disk drive market, a hard disk drive should be relatively inexpensive and should embody a design that is adaptive for low-cost mass production, while at the same time provide high data storage capacity and provide rapid access to data. Satisfying these competing restraints of low-cost, high data storage capacity, rapid access to data and improved reliability requires innovation in each of the numerous components of the disk drive, methods of assembly, and in testing. One way to satisfy these competing restraints is by purchasing and utilizing disks (i.e. media) at particular price points, which have some amount of expected disk defects, and margining these disk defects during verification testing of the disk drive before ultimately sending the disk drive out to a customer.

Currently, during disk drive functionality testing, before burn-in and before the disk drive is sent out to the customer, the disk is scanned for defects that are the result of, for example, scratches and/or thermal asperities on the disk. The entire surface of the disk may be scanned and a map or a table of detected defect patterns may be generated. Based upon the amount of detected defects it may be determined whether the disk drive is useable or not. The disk drive may fail the manufacturing process when to many defects are detected. In present methods, if the disk drive does not fail, as to the defects that are detected, only a minimal area corresponding to each detected defect is removed from data storage and this defect may spread during subsequent disk drive usage and the disk drive may ultimately fail for the disk drive purchaser. In particular, no additional margin around the detected defect areas is accounted for to provide better disk drive reliability.

Therefore, there is a need in the disk drive manufacturing process to enable further defect margining around detected media defects.

DETAILED DESCRIPTION

Figure 1:
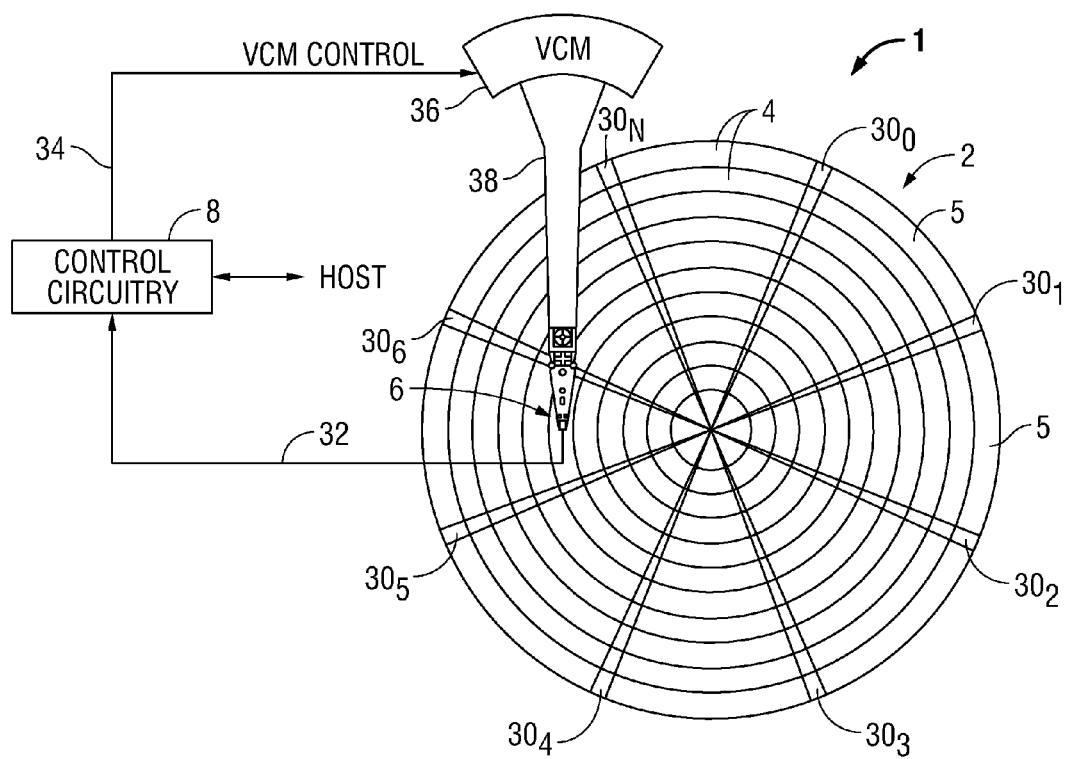
FIG. 1 shows a disk drive according to one embodiment of the invention.

FIG. 1 shows a disk drive 1 according to one embodiment of the invention comprising a disk 2 having a plurality of tracks 4 and a head 6 actuated over the disk 2. The disk drive further comprises control circuitry 8 operable to implement a read channel optimization process.

In one embodiment, disk 2 comprises a plurality of embedded servo sectors $30_0$-$30_N$ which define the plurality of tracks 4. Each servo sector $30_i$ comprises head positioning information such as a track address for course positioning during seeks and servo bursts for fine positioning while tracking the centerline of a target track during write/read operations. Further, each of the tracks 4 includes data sectors 5 between each of the servo sectors 30. The control circuitry 8 processes a read signal 32 emanating from the head 6 to demodulate the servo sectors into a position error signal (PES). The PES is filtered with a suitable compensation filter to generate a control signal 34 applied to a voice coil motor (VCM) 36 which rotates an actuator arm 38 of an actuator assembly about a pivot in a direction that reduces the PES.

Figure 2:
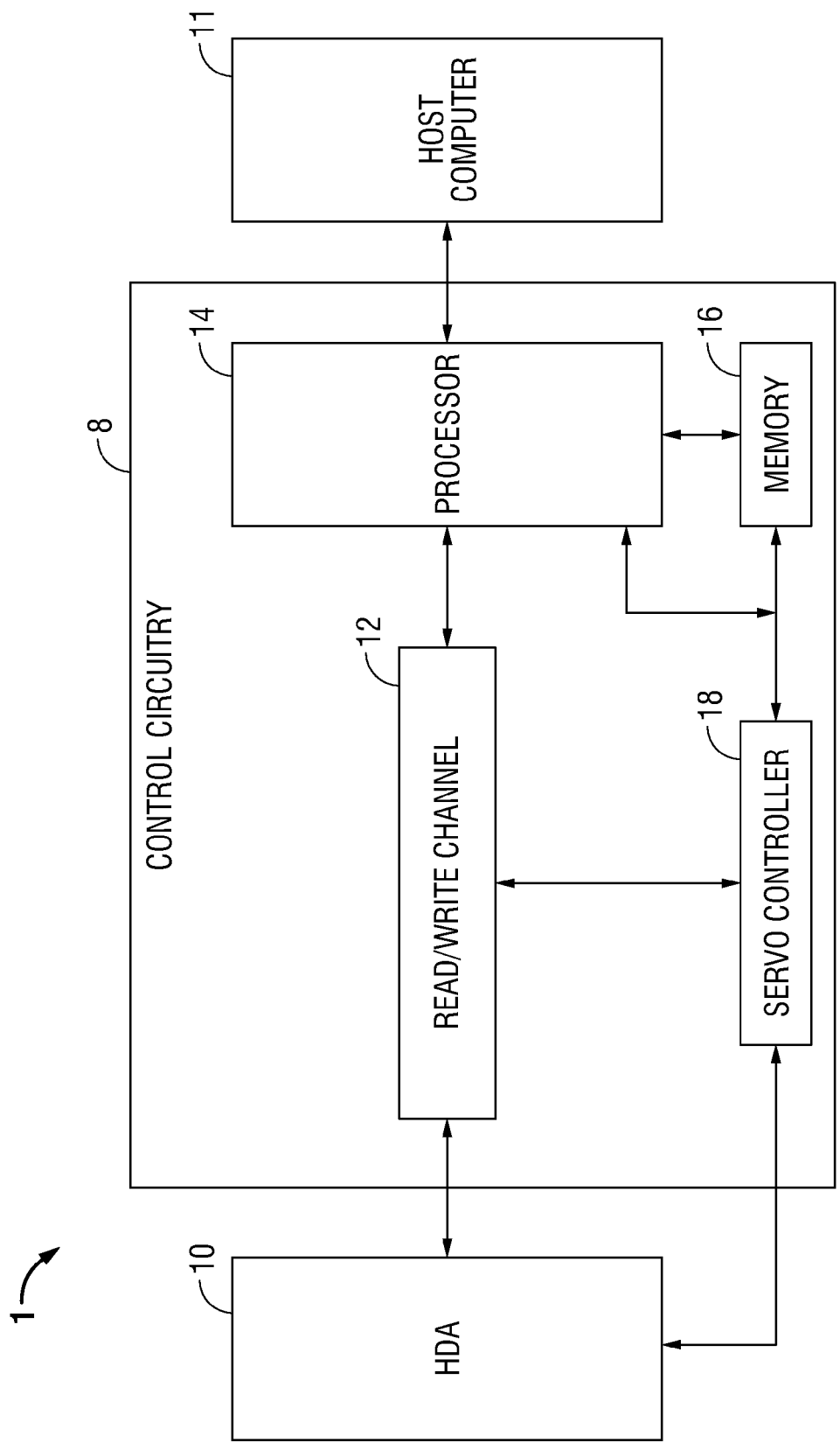
FIG. 2 shows a simplified block diagram of components of a disk drive in which embodiments of the invention may be practiced.

With reference also to FIG. 2, FIG. 2 shows a simplified block diagram of components of disk drive 1 in which embodiments of the invention may be practiced. Disk drive 1 may comprise a Head Disk Assembly (HDA) 10 and control circuitry 8 that may be implemented in a printed circuit board assembly (PCBA). Control circuitry 8 may be coupled to a host computer 11 such as a desktop computer, a laptop computer, a mobile computing device (e.g., PDA, camera, cell-phone, etc.), or any type of computing device.

HDA 10 may comprise one or more disk(s) 2, a spindle motor for rapidly spinning each disk 2 on a spindle, and an actuator assembly including a VCM 36 and an actuator arm 38 for moving one or more head(s) 6 in unison over disk(s) 2, as previously described. Further, as previously described, disk(s) 2 may be formatted with servo sectors 30, and data sectors 5. Control circuitry 8 may comprise a read/write channel 12, a processor 14, a memory 16, and a servo controller 18.

Host initiated operations for reading and writing data for disk drive 1 may be executed under the control of processor 14 connected to the read/write channel 12, servo controller 18, and memory arrays 16. For example, program code executed by processor 14 may be stored in non-volatile memory and random access memory (RAM) 16. Program overlay code stored on reserved tracks 4 of disk 2 may also be loaded into memory 16 as required for execution.

During disk read and write operations, data transferred by HDA 10 may be encoded and decoded by read/write channel 12. For example, during read operations, read/write channel 12 may decode data into digital bits for use by processor 14. During write operations, processor 14 may provide digital data to read/write channel 12 which encodes the data prior to its transmittal to HDA 10.

Further, processor 14 may operate as a disk controller for formatting and providing error detection and correction of disk data, a host interface controller for responding to commands from host 11, and a buffer controller for storing data which is transferred between disk(s) 2 and host 11.

Servo controller 18 provides an interface between processor 14 and HDA 10. Processor 14 may command logic in servo controller 18 to position actuator arm 38 and head 6 using VCM driver 36 and to precisely control the rotation of a spindle motor to spin the disk(s) 2.

Disk drive 1 may employ a sampled servo system in which equally spaced servo sectors 30$i$ are recorded on each track 4 of each disk 2. Data sectors 5 are recorded in the intervals between the servo sectors on each track. Servo sectors 30$i$ may be sampled at regular intervals by servo controller 18 to provide servo position information to processor 14. Servo sectors 30$i$ may be received by read/write channel 12 and are processed by servo controller 18 to provide position information to processor 14. It should be appreciated that this is a simplified description of a disk drive 1 and that many different types of disk drive implementations may be implemented in accordance with embodiments of the invention.

In one embodiment, disk drive 1 may be used extend defect margining during disk drive burn-in testing procedures. In particular, processor 14 may be used in the disk drive burn-in testing process to detect media defects and to generate an initial defect list based upon detected media defects for sectors (e.g., data wedge sectors 5 and track/cylinder sectors 4). Further, processor 14 may generate an extended defect list that includes the detected media defects and extended defect margins that extend from the detected media defects. Processor 14 may utilize the extended defect list during the burn-in process in which a spare area of the disk 2 is used to store user data area sectors to compensate for the detected media defects and the extended defect margins.

Therefore, disk drive 1 may detect media defects in sectors of the disk 2 during scanning, may update the defect log, and may then additionally margin around the detected defects to reduce potential defect growth and may extend the user data area into a spare area, as will be described in more detail later. In this way, disk drive reliability is increased.

Figure 3:
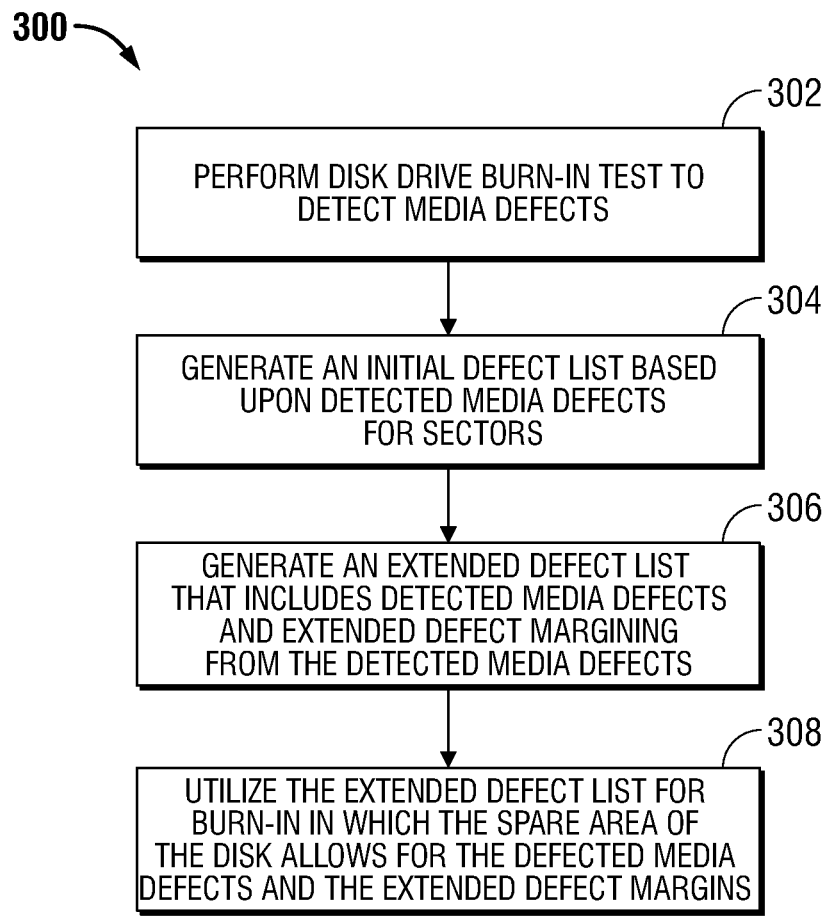
FIG. 3 is a flow diagram illustrating a process to enable extended defect margining for a disk drive during burn-in testing, according to one embodiment of the invention.

With additional reference to FIG. 3, FIG. 3 is a flow diagram illustrating a process 300 implemented by processor 14 to enable extended defect margining for a disk drive 1 during burn-in testing, according to one embodiment of the invention. A disk drive burn-in test includes performing scanning of the disk 2 to detect media defects (block 302). Based upon this scanning, an initial defect list based upon detected media defects for sectors (e.g., cylinder sectors 4 and wedge sectors 5) is generated (block 304). Next, an extended defect list that includes the detected media defects and extended defect margins from the detected media defects is generated (block 306). In process 300, by utilizing the extended defect list for burn-in in conjunction with a spare area of the disk 2, both the detected media defects and the extended defect margins may be accounted for by utilizing the spare area (block 308).

Figure 4:
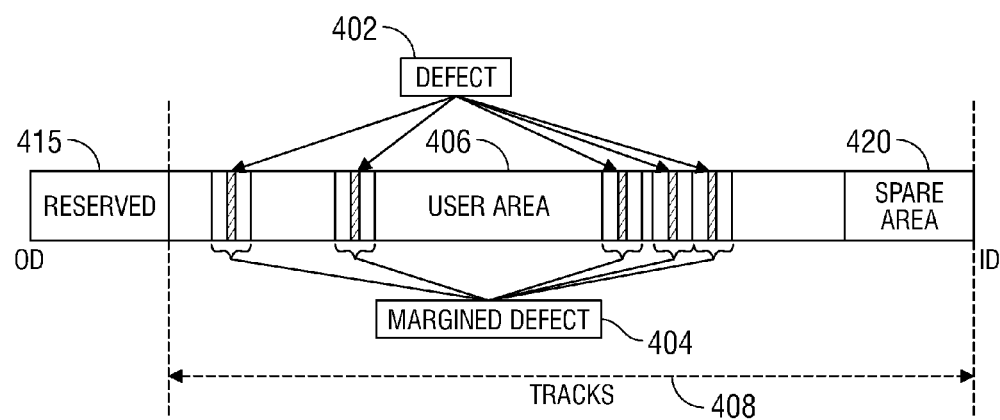
FIG. 4 is a diagram illustrating the detection of defects and creating margin defects across the user area of a disk, according to one embodiment of the invention.

With additional reference FIG. 4, FIG. 4 is a diagram illustrating the detection of defects 402 and creating margin defects 404 across the user area 406 of tracks 408 of a disk, according to one embodiment of the invention. In this illustration, the outer diameter (OD) has a reserved section 415 and a spare area 420 is located adjacent the inner diameter (ID) of the disk. It should be appreciated that the user area 406 includes one or more wedge sectors and all of the cylinder sectors corresponding to the tracks 408.

As part of the burn-in test, disk drive 1 under the control of processor 14 scans all of the wedge and cylinder sectors of all of the tracks 408 of the disk and identifies various defects 402 in association with the wedge and cylinder sectors and based upon this generates an initial defect list. Based upon detected defects 402, processor 14 creates extended defect margins 404 across adjacent cylinder and wedge sectors to compensate for potential defect growth and to increase drive reliability. Processor 14 then creates an extended defect list that includes both the detected media defects 402 and the extended defect margins 404. Based upon these identified defects 402 and margined defects 404, during burn-in, by utilizing the extended defect list, the spare area 420 is used to store the user data area 406 that is extended to compensate for the extended defect margins 404 such that the disk can be fully utilized for data storage. In this way, potential future defect growth can be accounted for by the extended margin defects 404 and disk drive reliability increased. For example, these processes may be implemented by processor 14.

As an example, when disk 2 is scanned for media defects before burn-in, when disk drive 1 detects a media defect 402 in the user data area 406, processor 14 updates the defect log and performs defect margining to create margin defect areas 404 around the detected defect 402 to thereby remove the defect and to compensate for potential future defect growth and further updates the defect log to create an extended defect log. In this way, an extended defect log is created that includes the detected media defects 402 and the extended margin defects 404 such that the extended defect log maps out both detected defect areas 402 and extended margined defect areas 404 that are margined around them. The extended defect log is then utilized during burn-in such that the user data area 406 is extended into the spare area 420 allowing for the removal of the detected media defects 402 and the extended defect margins 404 such that potential defect growth may be compensated for and disk drive reliability is increased.

Figure 5:
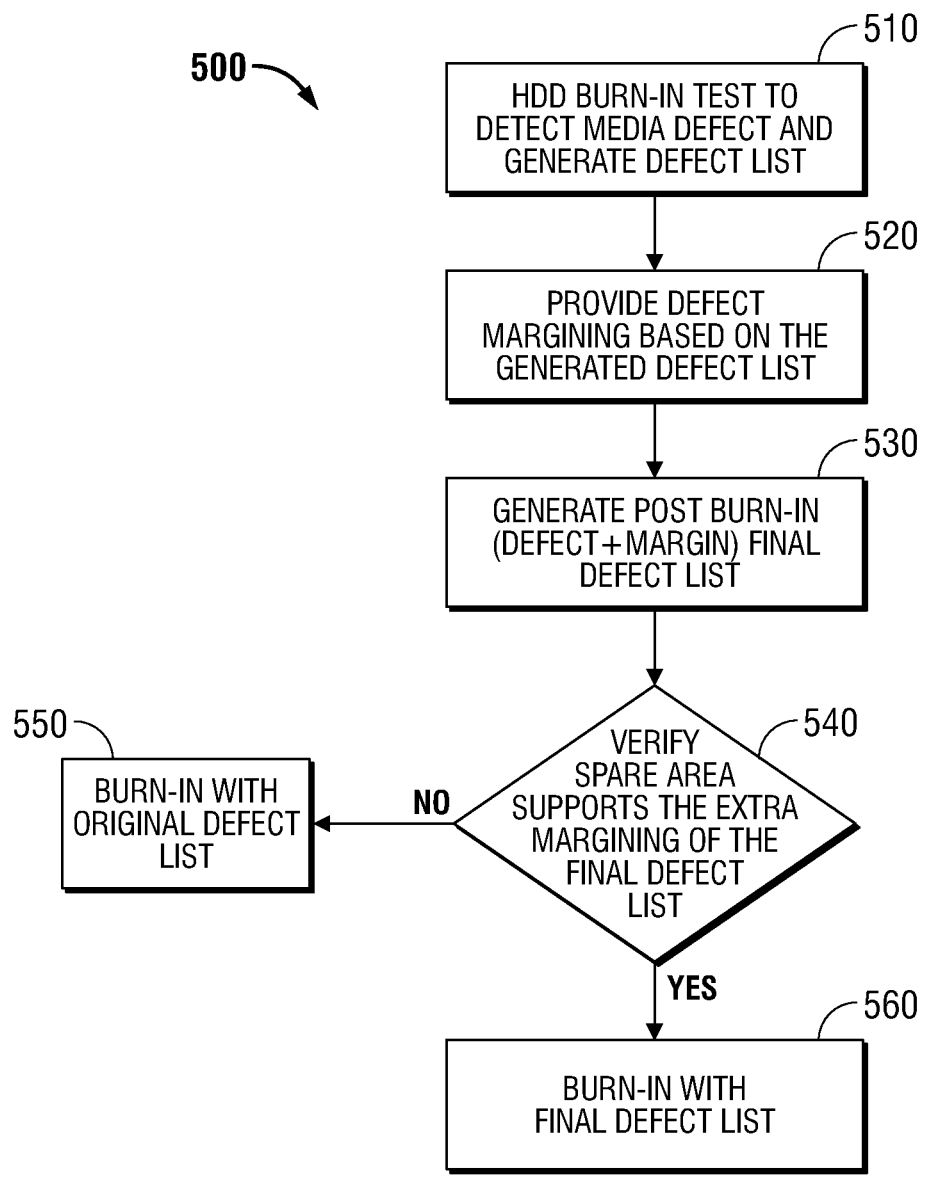
FIG. 5 is a flow chart illustrating a process to extend defect margining into a spare area, according to one embodiment of the invention.

With additional reference to FIG. 5, a flow chart illustrating a process 500 to extend defect margining into a spare area 420 is shown. As part of the hard disk drive (HDD) burn-in test, the disk is scanned to detect immediate defects 402 and to generate a defect list (block 510). Further, process 500 provides defect margining (e.g., the margined defects 404) to extend the detected defects 402 based on the generated defect list (block 520). A post burn-in (defect+margin) final defect list is then generated (block 530). Next, at decision block 540, it is verified whether the spare area 420 can support the extra margining from the extended margin defects 404 of the final defect list. If not, the burn-in process proceeds with the original defect list (block 550). However, if the spare area 420 can support the extra margining then burn-in proceeds with the final defect list (block 560).

Thus, processor 14 may verify that the use of extended defect margins 404 is permissible and, if so, proceed with the use of the extended defect margins 404 with the extended defect list, and if not, utilize the initial defect list for burn-in. The use of the extended defect margins 404 may not be permissible if the spare area 420 is not large enough to accommodate the extended defect margins 404. Further, the use of the extended defect margins 404 may not be permissible if generating the extended defect list exceeds a time threshold. Moreover, the use of the extended defect margins 404 may not be permissible if generating the extended defect list exceeds a size threshold for the extended defect list. Further, as will be described in more detail hereinafter, various types of extra margining around the detected defects may be implemented such as: cluster end fill; cluster gap fill; diagonal gap fill and diagonal end fill margining; increasing TA padding; and PDW by track.

Figure 6:
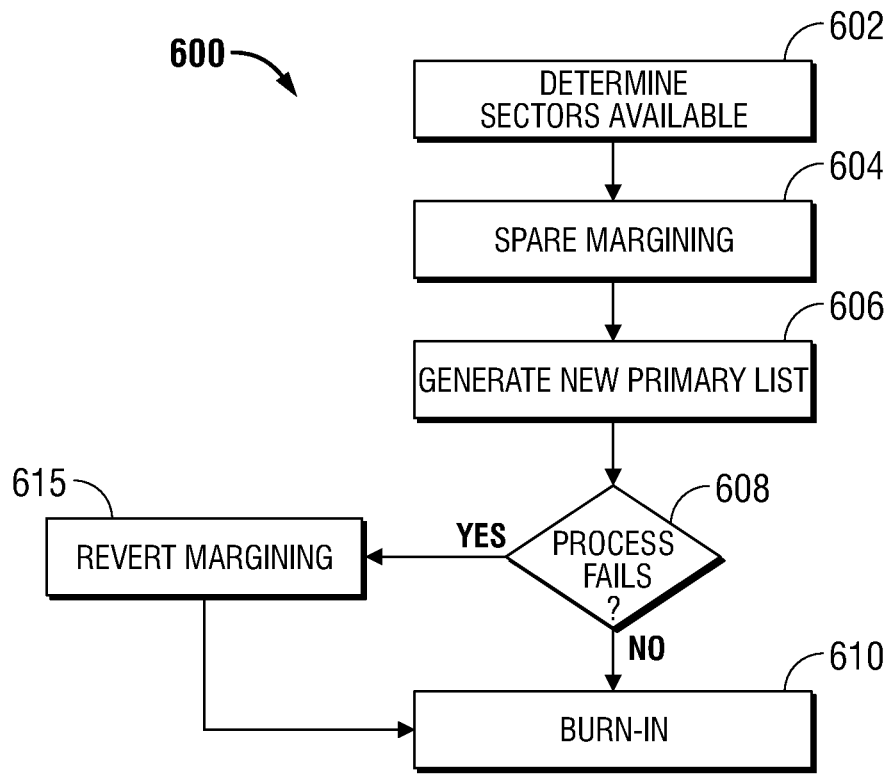
FIG. 6 is a flow chart that illustrates a process to implement extended defect margining, according to one embodiment of the invention.

With additional reference to FIG. 6, FIG. 6 is a flow chart that illustrates a process 600 to implement extended defect margining, according to one embodiment of the invention. At block 602, process 600 determines what sectors are available. In particular, it is determined which cylinder and wedge sectors 4, 5 can be utilized in the spare area 420. For example, this may be vender specific, i.e., dependent upon the type of disk 2. The spare area 420 is typically media space that is pre-set not to be used and is sometimes referenced as "no man's land". At block 604, spare margining is performed. As previously described, spare margining refers to detecting defects 402 and creating margined defect areas 404. Further, each time a defect 402 and margin defect 404 is defined a corresponding amount of space is deducted from the spare area 420. Based upon this spare margining, a new primary list is generated that identifies all of the locations that cannot be used for data storage (block 606).

Next, at decision block 608, it is determined whether the process 600 passes or fails. For example, process 600 may fail if all of the spare area 420 sectors are used up, or if the number of margin generating processes exceed a threshold, or if generating the new primary list exceeds a time threshold. If the process fails, then at block 615, the new primary list is not utilized and margining is reverted back to the original defect list. Afterwards, the burn-in process proceeds (block 610). However, if process 600 does not fail, then the new primary list and all of the extended margined defects 404 are utilized and burn-in proceeds (block 610).

Figure 7:
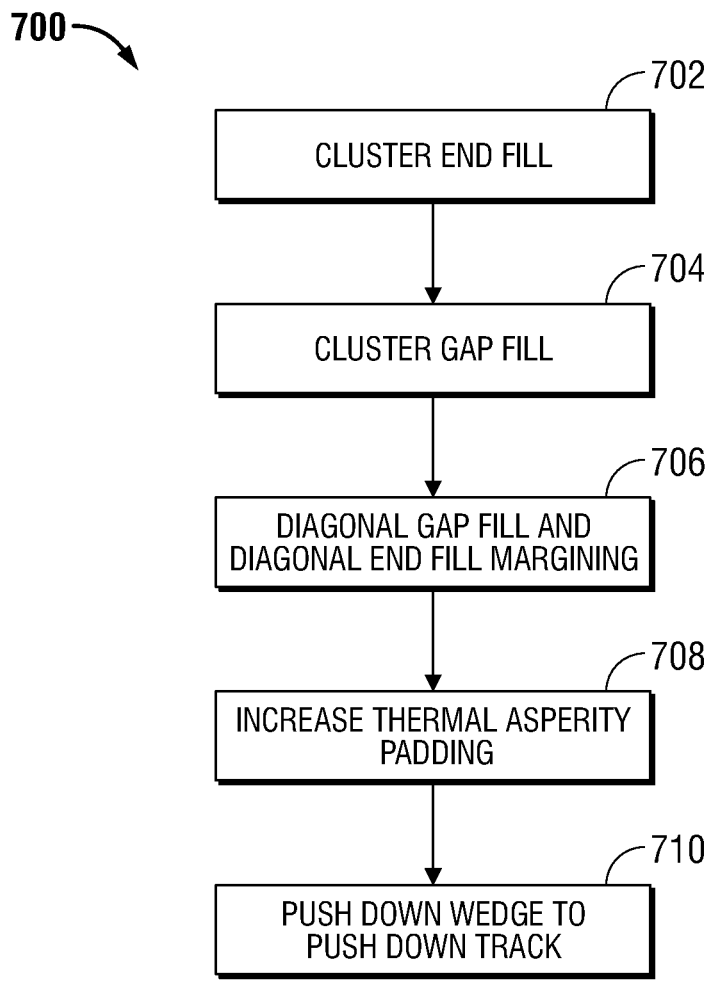
FIG. 7 illustrates a series of process steps that can be implemented in order to implement extended defect margining, according to one embodiment of the invention.

With brief reference to FIG. 7, FIG. 7 illustrates a series of process steps 700 that can be implemented in order to implement extended defect margining, according to one embodiment of the invention. At block 702, a cluster end fill process may be utilized. At block 704, a cluster gap fill process may be utilized. At block 706, a diagonal gap fill and a diagonal end fill margining process may be utilized. At block 708, thermal asperity padding may be utilized. At block 710, a push down wedge process to push down tracks may be utilized.

Figure 8:
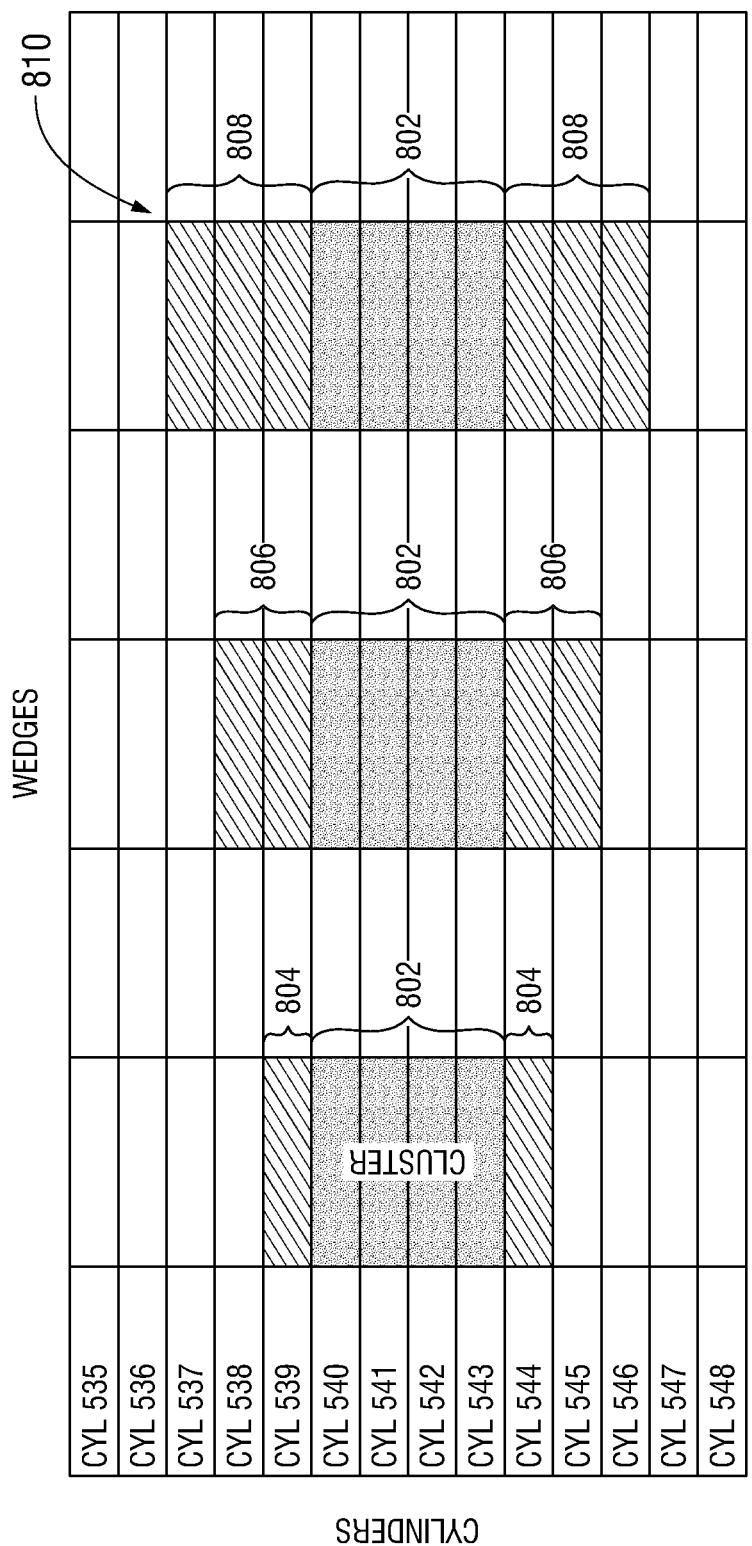
FIG. 8 is a diagram that shows a process to implement cluster end fill, according to one embodiment of the invention.

With reference FIG. 8, FIG. 8 shows a process to implement cluster end fill, according to one embodiment of the invention. It should be appreciated that extended defect margins may include at least one of an adjacent cylinder sector or an adjacent wedge sector to the detected defect for a sector. For example, FIG. 8 is a diagram showing a plurality of cylinder sectors along the Y-axis and a plurality of wedge sectors along the X-axis. As part of the cluster end fill process, a cluster of defect margins 802 is first identified across a plurality of cylinder sectors. Next defect margining may occur in which cluster 802 is extended by margining to include additional adjacent cylinder sectors 804 (e.g., cylinder 539 and cylinder 544). Further, as can be seen in FIG. 8, the original cluster defect 802 may be further extended. In particular, as shown in FIG. 8, an additional pair of adjacent cylinder sectors 806 may be extended or even three cylinder sectors 808 may be extended.

In this way, extended defect margins may include a cylinder cluster end fill margin in which a cluster of detected media defects across a plurality of cylinders 802 are extended to include a plurality of other cylinders (e.g., 804, 806, 808) such that a larger cluster is formed to define the cluster end fill margin 810. It should be appreciated that clusters of different size can be initially detected and different sizes of extended cylinder defect margins may be utilized. This may include a cluster of only one sector that may be extended. Further, although the previous description shows cylinder extensions, the same process may utilized for wedge extensions in a similar manner.

Figure 9:
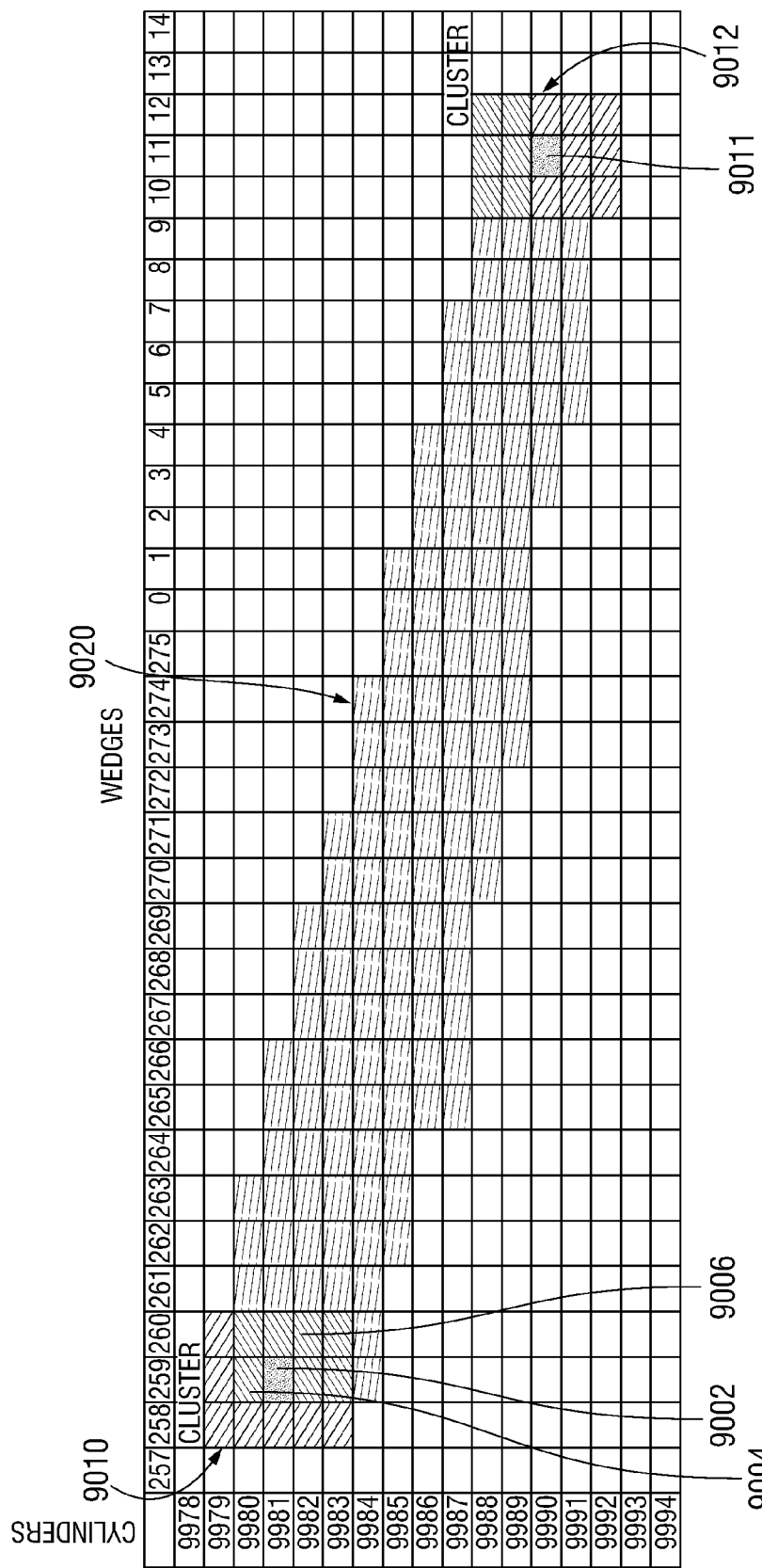
FIG. 9 is a diagram that illustrates cluster gap fill margining and diagonal gap fill and diagonal end fill margining, according to one embodiment of the invention.

FIG. 9 is a diagram that illustrates cluster gap fill margining and diagonal gap fill and diagonal end fill margining, according to one embodiment of the invention. Looking at a first detected defect 9002, detected defect 9002 may be extended with margined defects of both adjacent cylinder sectors and adjacent wedge sectors 9004 and 9006 in conjunction with other adjacent cylinder sectors and wedge sectors to form an approximately square shaped extended margin defect cluster 9010. A similar square shaped cluster 9012 about an identified defect 9011 may also be created, as shown in FIG. 9. In one embodiment a cluster gap fill 9020 may be extended between at least a pair of cluster gap fill margins, such as, cluster gap fill margins 9010 and 9012. In this example, the cluster gap fill 9020 is approximately diagonally shaped and includes a plurality of cylinder sectors and wedge sectors to define the diagonal shape.

In this way a defects 9002 and 9011 are each extended by creating cluster gap fill margins 9010 and 9012 that include both wedge and cylinder sectors. Further, if cluster gap fill margins are relatively close to one another, such as cluster gap fill margins 9010 and 9012, a cluster gap fill 9020 (e.g., diagonally-shaped) may extend between the pair of cluster gap fill margins 9010 and 9012 to ensure that defect growth and thermal asperity cannot extend between the two detected defects 9002 and 9011.

Figure 10:
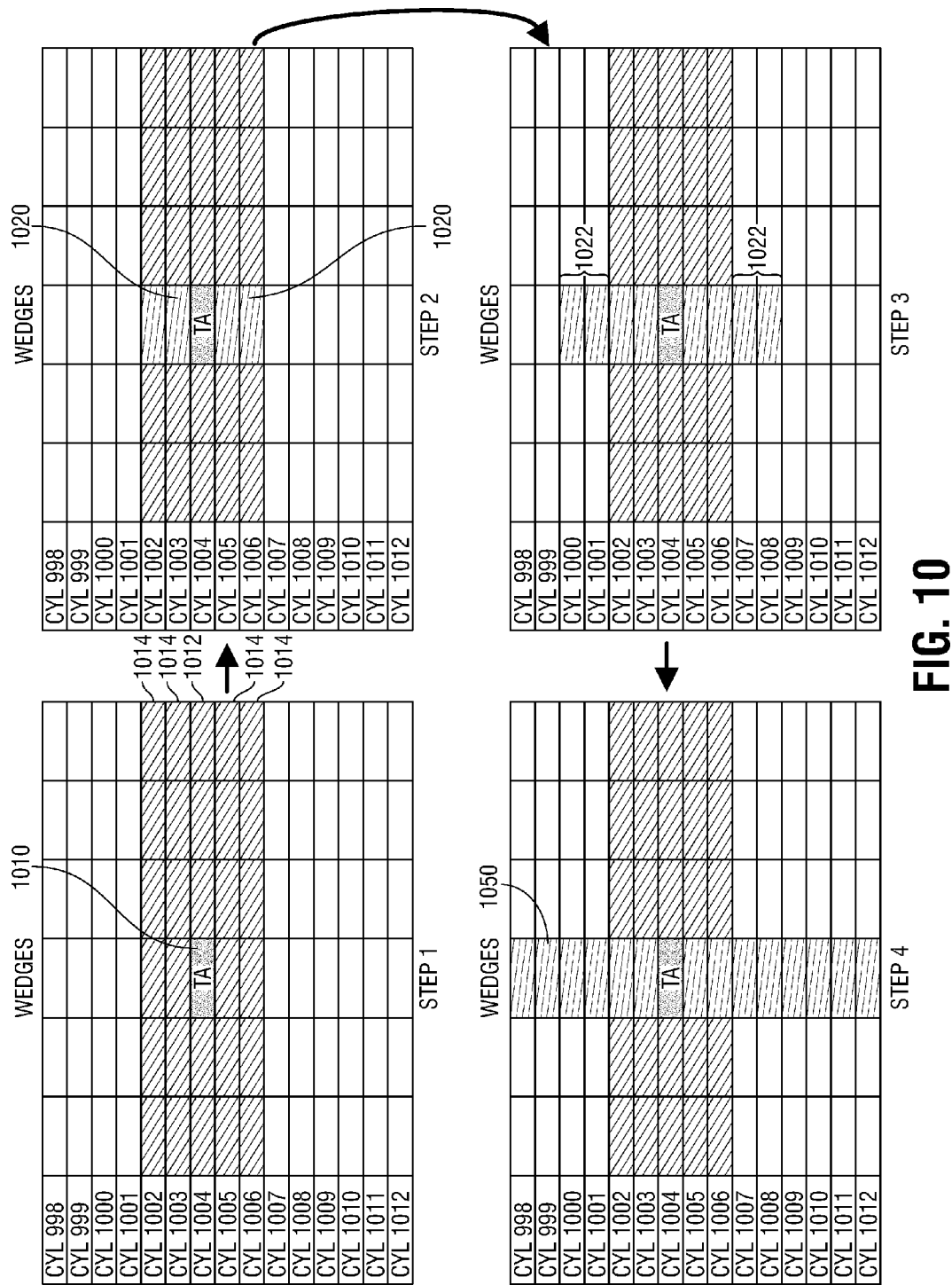
FIG. 10 is a diagram that illustrates an example of compensating for thermal asperity (TA), according to one embodiment of the invention.

With reference to FIG. 10, a diagram of an example of compensating for thermal asperity (TA) is illustrated, according to one embodiment of the invention. As will be described, processor 14 performs TA padding in which extended defect margins are generated from a detected media defect to compensate for TA. As can be seen in wedge/cylinder illustration step 1, a TA defect 1010 has been detected. Based upon this TA detection 1010, cylinder defect margins 1012 are extended across the whole cylinder 1012 to define the cylinder margins. Further, other adjacent whole cylinders are extended across whole cylinders 1014 to define additional adjacent cylinder margins to provide TA padding.

Additionally, as show in step 2, extended defect margins may include wedge cluster end fill margins 1020 in which a plurality of other wedges are extended in order to define a wedge cluster end fill margin to provide TA padding. Further, as shown in step 3, wedge cluster end fill margins 1020 may be continuously increased by additional wedge cluster end fill margins 1022 to increase TA padding. In one particular embodiment, as shown in step 4, a wedge cluster end fill margin 1050 may be generated to extend across the whole wedge to increase TA padding.

It should be appreciated that after all of the defects and margined defect sectors have been defined, as previously described, processor 14 in implementing the burn-in process pushes defective wedges down the tracks such that the user data area 406 is extended into the spare area 420 allowing for the removal of the detected media defects 402 and the extended defect margins 404 so that potential defect growth may be compensated for and disk drive reliability is increased.

It should be appreciated that embodiments of the invention may be implemented in the control circuitry of a disk drive including but not limited to the read/write channel, processor, servo controller, memory etc., and may operate under the control of a program, firmware, or routine to execute methods or processes in accordance with the previously described embodiments of the invention.

For purposes of the present specification, it should be appreciated that the terms "processor", "controller", etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a subprogram, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes described previously can be employed by a disk drive. However, other types of data storage devices with similar or other media format characteristics can be employed by those skilled in the art to use the invention with equal advantage to implement these techniques.

What is claimed is:

1. A method to enable defect margining during disk drive burn-in testing comprising:
    performing disk drive burn-in testing to detect media defects;
    generating an initial defect list based upon detected media defects for sectors;
    generating an extended defect list that includes detected media defects and extended defect margins from the detected media defects;
    determining whether the extended defect list or the initial defect list is to be utilized for burn-in; and
    utilizing either the extended defect list or the initial defect list for burn-in based on a result of the determination, wherein a spare area of the disk allows for the detected media defects and the extended defect margins when the extended defect list is utilized.

2. The method of claim 1, wherein the initial defect list is utilized for burn-in if the spare area is not large enough to accommodate the extended defect margins.

3. The method of claim 1, wherein the initial defect list is utilized for burn-in if generating the extended defect list exceeds a time threshold.

4. The method of claim 1, wherein the initial defect list is utilized for burn-in if generating the extended defect list exceeds a size threshold for the extended defect list.

5. The method of claim 1, wherein the extended defect margins include at least one of an adjacent cylinder sector or an adjacent wedge sector to the detected media defect for a sector.

6. The method of claim 1, wherein the extended defect margins include a cylinder cluster end fill margin in which a cluster of detected media defects across a plurality cylinders are extended to include a plurality of other cylinders such that a larger cluster is formed to define the cluster end fill margin.

7. The method of claim 6, wherein the extended defect margins include a cluster gap fill in which defect margins are extended between at least a pair of cluster end fill margins.

8. The method of claim 7, wherein the cluster gap fill is approximately diagonally shaped.

9. The method of claim 1, wherein the extended defect margins include a cylinder margin in which based upon one or more defects in a cylinder the defect margins are extended across the whole cylinder to define the cylinder margin.

10. The method of claim 1, wherein the extended defect margins include a wedge cluster end fill margin in which a cluster of detected media defects across a plurality wedges are extended to include a plurality of other wedges such that a larger cluster is formed to define the wedge cluster end fill margin.

11. The method of claim 1, wherein the extended defect margins include a wedge margin in which based upon one or more defects in a wedge the defect margins are extended across the whole wedge to define the wedge margin.

12. The method of claim 1, further comprising pushing defective wedges down tracks such that the spare area of the disk allows for additional disk use area.

13. The method of claim 1, further comprising thermal asperity padding wherein extended defect margins are generated from the detected media defects to compensate for thermal asperity.

14. A disk drive to enable defect margining during disk drive burn-in testing comprising:
    a disk comprising a plurality of tracks;
    a head actuated over the disk; and
    a processor to:
        perform disk drive burn-in testing to detect media defects;
        generate an initial defect list based upon detected media defects for sectors;
        generate an extended defect list that includes detected media defects and extended defect margins from the detected media defects;

determine whether the extended defect list or the initial defect list is to be utilized for burn-in; and utilize either the extended defect list or the initial defect list for burn-in based on a result of the determination, wherein a spare area of the disk allows for the detected media defects and the extended defect margins when the extended defect list is utilized.

15. The disk drive of claim 14, wherein the initial defect list is utilized for burn-in if the spare area is not large enough to accommodate the extended defect margins.

16. The disk drive of claim 14, wherein the initial defect list is utilized for burn-in if generating the extended defect list exceeds a time threshold.

17. The disk drive of claim 14, wherein the initial defect list is utilized for burn-in if generating the extended defect list exceeds a size threshold for the extended defect list.

18. The disk drive of claim 14, wherein the extended defect margins include at least one of an adjacent cylinder sector or an adjacent wedge sector to the detected media defect for a sector.

19. The disk drive of claim 14, wherein the extended defect margins include a cylinder cluster end fill margin in which a cluster of detected media defects across a plurality cylinders are extended to include a plurality of other cylinders such that a larger cluster is formed to define the cluster end fill margin.

20. The disk drive of claim 19, wherein the extended defect margins include a cluster gap fill in which defect margins are extended between at least a pair of cluster end fill margins.

21. The disk drive of claim 20, wherein the cluster gap fill is approximately diagonally shaped.

22. The disk drive of claim 14, wherein the extended defect margins include a cylinder margin in which based upon one or more defects in a cylinder the defect margins are extended across the whole cylinder to define the cylinder margin.

23. The disk drive of claim 14, wherein the extended defect margins include a wedge cluster end fill margin in which a cluster of detected media defects across a plurality wedges are extended to include a plurality of other wedges such that a larger cluster is formed to define the wedge cluster end fill margin.

24. The disk drive of claim 14, wherein the extended defect margins include a wedge margin in which based upon one or more defects in a wedge the defect margins are extended across the whole wedge to define the wedge margin.

25. The disk drive of claim 14, wherein the processor further pushes defective wedges down tracks such that the spare area of the disk allows for additional disk use area.

26. The disk drive of claim 14, wherein the processor further performs thermal asperity padding wherein extended defect margins are generated from the detected media defects to compensate for thermal asperity.

\* \* \* \* \*